March 8, 1955        R. K. SUPER        2,703,638
VACUUM OPERATED POSITIVE TOOTH CLUTCHES
Filed Sept. 27, 1948        2 Sheets-Sheet 1

INVENTOR
Ralph K. Super
By Strauch & Hoffman
Attorneys

March 8, 1955  R. K. SUPER  2,703,638

VACUUM OPERATED POSITIVE TOOTH CLUTCHES

Filed Sept. 27, 1948  2 Sheets-Sheet 2

INVENTOR
Ralph K. Super
By Strauch + Hoffman
Attorneys

2,703,638

VACUUM OPERATED POSITIVE TOOTH CLUTCHES

Ralph K. Super, Ashtabula, Ohio, assignor, by mesne assignments, to Rockwell Spring and Axle Company, Coraopolis, Pa., a corporation of Pennsylvania Application September 27, 1948, Serial No. 51,435

4 Claims. (Cl. 192—87)

This invention relates to power dividers for vehicles and has for its general object and purpose to provide a simple, compact and efficiently operating mechanism, especially designed for use in connection with heavy duty commercial and military trucks for transmitting power torque at selective speeds and dividing the application thereof between dual drive axles for the vehicle.

A more particular object of this invention resides in the provision of a power torque divider of the above type comprising an input shaft for connection with the source of power and differential drive gearing, together with spaced axle drive shafts each having high and low speed gears rotatably mounted thereon and non-rotatable axially shiftable clutch members on said shafts to selectively connect said gears in driving relationship therewith, and vacuum operated means for simultaneously shifting said clutch members in opposite directions into and out of clutched engagement with the respective high and low speed drive gears.

An additional object of the invention is to provide a simply constructed actuator unit for the clutch shifting means whereby the slidable clutch member is disengaged from one gear by the power thrust of the actuator piston and shifted into clutched engagement with the other gear under diminished pressure by the action of an independently operating spring.

A further object of the invention is to provide simple and effective means for positively limiting the shifting movements of the clutch member in each direction to assure an accurately centered relationship of the clutch teeth on said member with the clutch teeth on the shaft driving gears.

The present invention further provides a simple independently operable means for locking the differential gearing out of action at the option of the driver so that the power torque may be differentially applied to two vehicle axles, or may be equally divided between said axles.

With the above and other objects in view, the invention resides in the improved power torque divider and in the form construction and relative arrangement of the several parts, as will hereinafter be more fully described, illustrated in the accompanying drawings and subsequently incorporated in the subjoined claims.

In the drawings, wherein I have disclosed one simple and practical embodiment of the invention and in which similar reference characters designate corresponding parts throughout the several views.

Figure 2:
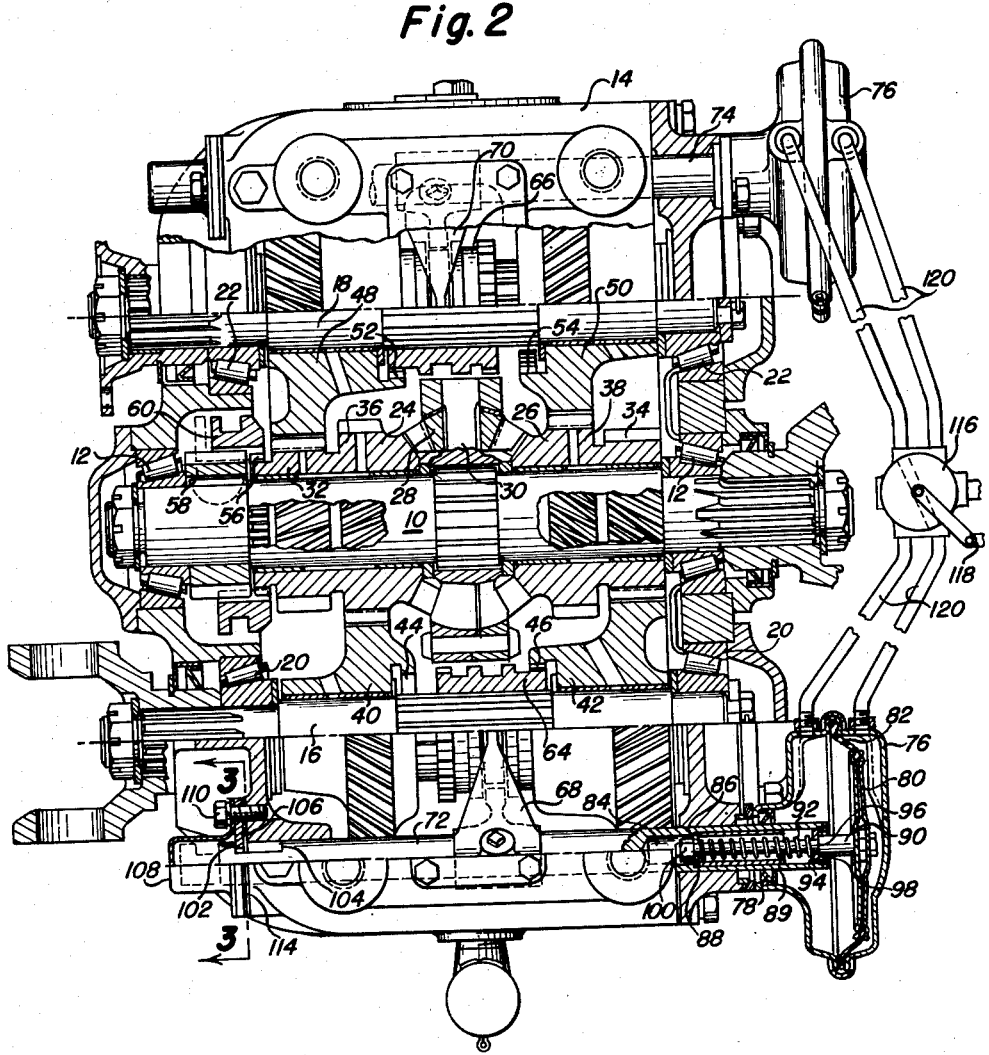
Figure 2 is a horizontal sectional view taken substantially on the line 2—2 of Figure 1.
Figure 3:
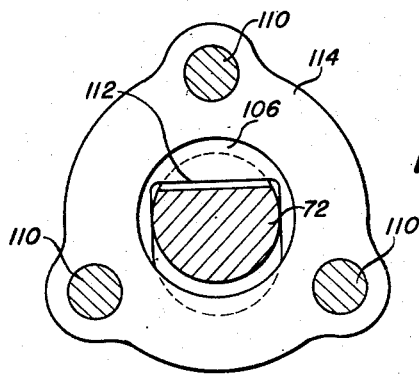
Figure 3 is a detail vertical section taken substantially on the line 3—3 of Figure 2.

Referring in further detail to the drawings and more particularly to Figure 2 thereof, the power input shaft 10 is journalled at its opposite ends in suitable bearings 12, mounted in the front and rear side walls of the transfer case or gear housing 14. The usual driving connections are provided between the engine or motor and the forward end of shaft 10, with or without a conventional change speed transmission.

Power output shafts 16 and 18 respectively are arranged in spaced parallel relation to the input shaft and also journalled at their opposite ends in bearings 20 and 22 respectively mounted in the opposite side walls of the housing 14. These shafts at their rear ends are operatively connected by the usual propeller shafts with the spaced rear axles of the vehicle.

A differential drive assembly is carried by input shaft 10 and includes the spaced elements 24 and 26 respectively rotatably mounted on said shaft and provided on their opposed ends with the usual beveled gears in constant mesh with the pinions 28 carried by the arms of a spider 30 non-rotatably splined to the shaft 10. Thus the elements 24 and 26 may be differentially driven from the input shaft.

The differential gear elements 24 and 26 are provided with identical low speed drive gears 32 and 34 respectively and also with identical high speed drive gears 36 and 38 respectively.

Spaced gears 40 and 42 are rotatably mounted on the output shaft 16 and provided on their opposed ends with internal clutch teeth 44 and 46 respectively. The gear 40 is in constant mesh with the high speed drive gear 36 on the differential gear element 24, while gear 42 is in constant mesh with the low speed gear 34 on differential gear element 26.

In similar manner, spaced gears 48 and 50 are rotatably mounted on the output shaft 18 and provided on their opposed ends with internal clutch teeth 52 and 54 respectively, gear 48 being in constant mesh with the low speed drive gear 32 on differential gear element 24, while gear 50 is in constant mesh with high speed gear 38 on differential gear element 26.

Figure 1:
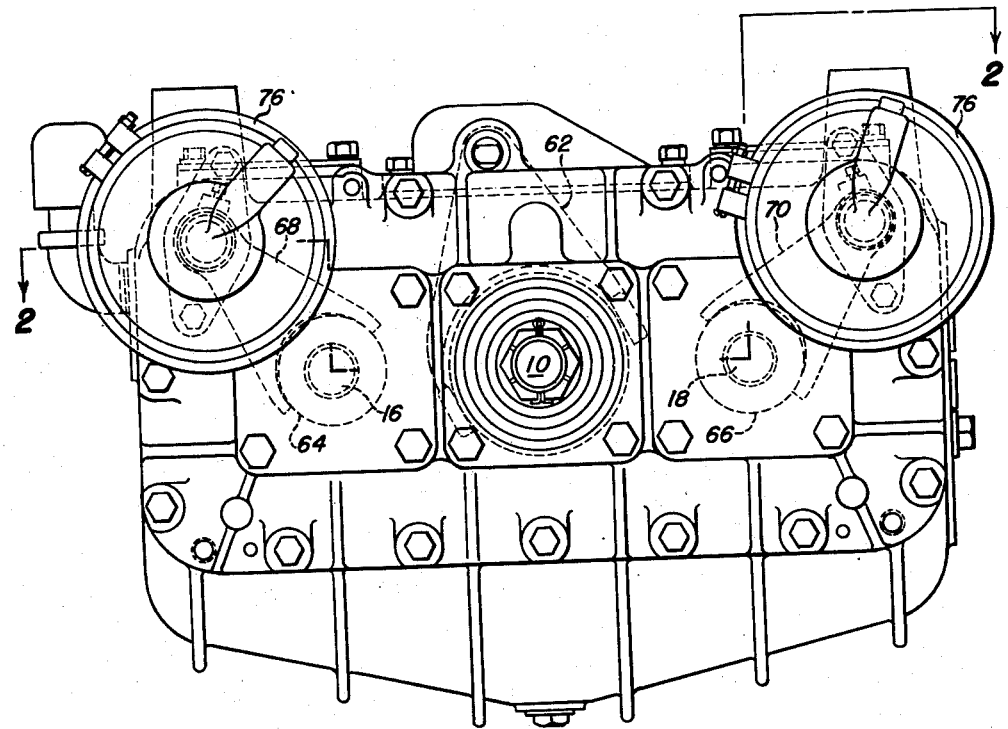
Figure 1 is a side elevation illustrating a power torque dividing unit constructed in accordance with one embodiment of the invention.

For the purpose of locking out the differential action, the outer end of gear element 24 is provided with external clutch teeth 56 and adjacent thereto and externally toothed member 58 is keyed to the input shaft 10. An axially shiftable internally toothed collar 60 is slidably engaged with the teeth of member 58 and is actuated by the shifter fork 62 (Fig. 1) suitably mounted in housing 14 and operated by suitable motion transmitting connections from the driver's cab of the vehicle. When the collar 60 is shifted to the position shown in Figure 2 to engage its internal teeth with teeth 56 on the differential gear element 24, said element, the spider 30 and gear element 26 together with member 58 will then rotate as a unit with the input shaft 10 so that the engine power torque will be equally divided between the output shafts 16 and 18 and the two rear axles of the vehicle. This is desirable when driving in the low speed gear ratio under adverse road conditions.

Between the spaced gears on output shafts 16 and 18 clutch members 64 and 66 respectively are splined on said shafts so that each clutch member is axially slidable on its associated shaft but non-rotatable with respect thereto. Each of these clutch members is provided at its opposite ends with external clutch teeth for engagement with the internal teeth on the opposed ends of the rotatable gears on the output shaft. The clutch members are actuated by shifter forks 68 and 70 respectively suitably secured to the shifter rods 72 and 74 mounted in the opposite side walls of housing 14 for axial movement.

Preferably I provide vacuum controlled actuators associated with the shifter rods 72 and 74 for simultaneously shifting the clutch members 64 and 66 in opposite directions into and out of effective engagement with the spaced gears on the respective power output shafts. As these actuators are of identical construction, the following description of the one associated with shifter rod 72, as shown in Figure 2 of the drawing, will suffice for a clear understanding of their operation.

In co-axial relation with the front end of shifter rod 72, projecting forwardly from the front wall of housing 14, an hermetically sealed casing 76 is rigidly secured to the housing wall. A suitable sealing unit 78 surrounds the rod 72 and prevents the leakage of lubricant from the interior of housing 14, into the casing 76. Within the casing 76, a piston 80 is peripherally connected with the cylindrical casing wall by a flexible membrane or diaphram 82.

The end of shifter rod 72 is provided with an axially extending bore 84 having a shoulder 86 spaced from the inner end thereof. A centrally apertured disc 88 is seated on shoulder 86. A sleeve 89 is slidably fitted within the bore 84. A piston rod 90 is rigidly fixed at its outer end to the piston 80 and is movable through the apertured disc 88 against the resistance of coil spring 92 surrounding said piston rod and bearing at one end against the disc 88 and at its other end against a disc 94 in abutting contact with shoulder 96 formed by the enlarged diameter outer end portion of the piston rod. Travel of sliable sleeve 89 in opposite directions is limited by abutment with discs 88 and 94. Outward movement of the disc 94 from the bore of the rod 72 is prevented by a split resilient ring 98 seated in an internal groove in the wall of said bore. Outward movement of the piston rod 90 through the disc 88 is limited by nut 100 threaded on the inner end of the piston rod.

At its opposite end, the shifter rod 72 is formed with an elongated recess providing longitudinally spaced stop shoulders 102 and 104 respectively. These shoulders are adapted to contact opposite side of a stop disc 106 secured to the outer face of the rear side wall of housing 14, together with a hollow cap member 108 which receives the end of the shifter rod 72, by means of the bolts 110. The opening in disc 106 through which the rod 72 moves is of the required form to provide the part 112 on said disc located in the recess and with which the shoulders 102 and 104 abut. The position of disc 106 with respect to the stop shoulders is properly adjusted by interposing one or more shim plates 114 between said disc and the wall of gear housing 14.

The casings 76 of the two actuator units are internally connected at opposite sides of the piston 80 with the engine manifold or other source of vacuum. For this purpose I have diagramatically illustrated in Figure 2 of the drawings a suitable type of control valve 116 and connecting conduits 120 between said valve and the actuator casings 76 at opposite sides of the pistons therein. The valve 116 is properly operated from the driver's cab by suitable connections indicated at 118 to selectively establish communication between the source of vacuum and the actuators through the conduits 120 at relatively opposite sides of their respective pistons 80 whereby the clutch members 64 and 66 are axially shifted in relatively opposite directions on the respective output shafts 16 and 18.

As shown in Figure 2 of the drawings the clutch members are engaged with the gears 42 and 48 to transmit driving torque from the input shaft 10 through the differential gearing to the respective output shafts 16 and 18 at the low speed ratio. When it is desired to establish the high speed driving ratio, the position of valve 116 is reversed and the source of vacuum connected with the actuator for shift rod 72 at the left hand side of its piston 80 and at the right hand side of the actuator piston for shift rod 74. Thus the piston associated with rod 72 would be moved toward the left and in the initial portion of this movement spring 92 is compressed between disc 94 and disc 88 which is seated on shoulder 86 as the piston rod moves axially relative to rod 72. At the same time, the driving torque on gear 42 is released and in the continued movement of the piston 80, the disc 94 abutting the end of sleeve 89 moves rod 72 to the left, and thereby positively shifts the clutch member 64 under high pressure out of engagement with the clutch teeth 46 on gear 42. Thereupon, spring 92 expands to continue the movement of rod 72 and yieldingly urge clutch member 64 into contact with the clutch teeth on the high speed gear 40 and, upon synchronization, effects a full meshed engagement of the teeth on member 64 with the teeth 44 on said gear. This final shifting movement of the clutch member under the action of spring 92 is definitely limited by contact of stop shoulder 104 on rod 72 with the disc 106 to assure accurate alignment and the most effective torque transmitting relationship between the teeth on the clutch member and the teeth on the gear 40.

The same shifting operation of the clutch member 66 in the opposite direction simultaneously occurs and as the actuator piston 80 therefor moves to the right, sleeve 89 is first axially moved relative to rod 74 to compress spring 92 and upon contact of the end of sleeve 89 with disc 94, rod 74 is positively moved to the right to disengage clutch member 66 from the teeth on gear 48, whereupon as spring 92 expands, the movement of said clutch member is continued toward the right and engaged with the clutch teeth on gear 50 in the manner above explained, such engaged position being definitely limited by contact of stop shoulder 102 on rod 74 with disc 106.

From the foregoing description and the accompanying drawings, it will be seen that the improved vacuum operated clutch shifting devices insures the quick and accurate shifting movement of the clutch members between selective driving positions, while avoiding metallic clash, excessive torque stresses and possible damage to the parts which might result from partial clutch tooth engagement. While the full power stroke of the actuator pistons is employed to disengage the teeth of the shiftable clutch members from the teeth on the gear elements, the movement of said clutch members to their engaged positions with the teeth on the gear elements is effected by yielding spring pressure and independently of the power movement of the actuator piston. The adjustable stop means 106 for assuring a fully intermeshed relationship of the teeth on the clutch member and gear element and the most effective transmission of the driving torque to the power output shaft is also an important practical feature of the invention.

The invention may be embodied in other specific forms without departing from the spirit and essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a variable speed power apparatus having a support on which a speed selector element is reciprocated between two axially spaced positions, a rod reciprocable on said support parallel to the path of said element, a fluid powered device connected to one end of said rod for reciprocating the rod between said positions, a recess in the other end of said rod providing longitudinally spaced shoulders thereon, and a relatively stationary stop plate removably mounted on said support projecting into said recess between said shoulders so that opposite sides of said stop plate are abutted by one or the other of said shoulders when the rod is moved by said device to shift said element into either position.

2. In the combination defined in claim 1, said stop plate mounted on the support being apertured to slidably pass said rod and having a projection extending into said recess for contact by said shoulders.

3. In combination, a variable speed power transmission having a housing, a clutch collar within said housing slidable between two different drive speed ratio positions comprising a power operated rod slidably mounted in said housing parallel to the direction of shift of said collar and operably connected to said collar, a fluid pressure differential responsive device connected to one end of said rod at one side of said housing, and means arresting longitudinal movement of said rod when said collar reaches either of said positions comprising a surface recess in said rod providing longitudinally spaced stop shoulders, a cap secured to said housing over said other end of said rod and a plate secured between said cap and said housing having an aperture to permit passage of said rod and a projection extending into said recess to engage one of said shoulders when the rod has moved to one or the other of said positions.

4. In combination, a variable speed power apparatus having a support on which a speed selector element is reciprocated between two axially spaced positions, a rod reciprocable on said support parallel to the path of said element, a fluid powered device connected to one end of said rod for reciprocating the rod between said positions, a recess in the other end of said rod providing longitudinally spaced shoulders thereon, a relatively stationary stop member on said support comprising a plate removably secured to said support and projecting into said recess between said shoulders so that said plate is abutted by one of said shoulders when the rod is moved by said device to shift said element into either position, and a plurality of shims between the plate and support for determining the relative disposition of the plate in the recess, said shims constituting an adjustment for said plate.

(References on following page)

References Cited in the file of this patent

UNITED STATES PATENTS

| Number | Name | Date |
|---|---|---|
| 473,686 | Williams | Apr. 26, 1892 |
| 923,930 | Bearbalck | June 8, 1909 |
| 961,865 | Kleinhan | June 21, 1910 |
| 1,902,038 | McAllister | Mar. 21, 1933 |
| 1,993,247 | Penati | Mar. 5, 1935 |
| 2,092,580 | Kelley | Sept. 7, 1937 |
| 2,100,312 | Fawick | Nov. 30, 1937 |
| 2,117,852 | Pearmain | May 17, 1938 |
| 2,124,507 | Hodgkins | July 19, 1938 |
| 2,158,320 | Bock | May 16, 1939 |
| 2,227,055 | Bischoff | Dec. 31, 1940 |
| 2,234,693 | Frink | Mar. 11, 1941 |
| 2,286,671 | Crittenden et al. | June 16, 1942 |
| 2,314,833 | Keese | Mar. 23, 1943 |
| 2,334,375 | Ball | Nov. 16, 1943 |
| 2,356,598 | Lang et al. | Aug. 22, 1944 |
| 2,373,259 | Price | Apr. 10, 1945 |
| 2,452,775 | Lindsley | Nov. 2, 1948 |
| 2,605,749 | Buckendale | Aug. 5, 1952 |